(12) United States Patent
Choo et al.

(10) Patent No.: US 11,310,039 B2
(45) Date of Patent: Apr. 19, 2022

(54) LIGHTWEIGHT DISTRIBUTED SIGNATURE PROTOCOL FOR MOBILE COMPUTING AND IOT DEVICES

(71) Applicant: Board of Regents, The University of Texas System, Austin, TX (US)

(72) Inventors: Kim Kwang Choo, San Antonio, TX (US); Debiao He, Wuhan (CN)

(73) Assignee: Board of Regents, The University of Texas System, Austin, TX (US)

( * ) Notice: Subject to any disclaimer, the term of this patent is extended or adjusted under 35 U.S.C. 154(b) by 5 days.

(21) Appl. No.: 16/688,311

(22) Filed: Nov. 19, 2019

(65) Prior Publication Data

US 2020/0162242 A1     May 21, 2020

Related U.S. Application Data

(60) Provisional application No. 62/769,654, filed on Nov. 20, 2018.

(51) Int. Cl.
*H04L 9/08*     (2006.01)
*H04L 9/32*     (2006.01)

(52) U.S. Cl.
CPC .......... *H04L 9/083* (2013.01); *H04L 9/0825* (2013.01); *H04L 9/0866* (2013.01); *H04L 9/3247* (2013.01)

(58) Field of Classification Search
None
See application file for complete search history.

(56) References Cited

U.S. PATENT DOCUMENTS

| | | | |
|---|---|---|---|
| 9,124,433 B2 * | 9/2015 | Marien | H04L 9/3234 |
| 2006/0285683 A1 * | 12/2006 | Anatharaman | H04L 9/085 380/30 |

\* cited by examiner

*Primary Examiner* — Jeffrey C Pwu
*Assistant Examiner* — Mayasa A. Shaawat
(74) *Attorney, Agent, or Firm* — Smith, Gambrell & Russell LLP

(57) ABSTRACT

The techniques described herein may provide an efficient and secure two-party distributed signing protocol, for example, for the IEEE P1363 standard. For example, in an embodiment, method may comprise generating, at a key generation center, a first partial private cryptographic key for a user ID and a second partial private cryptographic key for the user ID, transmitting the first partial private cryptographic key to a first other device, transmitting the second partial private cryptographic key to a second other device, and generating a distributed cryptographic signature for a message using the first partial private cryptographic key and the second partial private cryptographic key.

6 Claims, 7 Drawing Sheets

LIGHTWEIGHT DISTRIBUTED SIGNATURE PROTOCOL FOR MOBILE COMPUTING AND IOT DEVICES

BACKGROUND OF THE INVENTION

The present invention relates to an efficient and secure two-party distributed signing protocol.

Mobile device and application (app) security is a topic of ongoing interest, particularly due to the speed of cyberthreat evolution. To ensure the security of communication (e.g. data-in-transit), a number of identity-based signature protocols have been designed to facilitate authorization identification and validation of messages. However, most of these protocols may leak a user's private key when a new signature is generated, since the private keys are stored on the devices.

One of the challenges in designing security solutions, particularly cryptographic solutions, for mobile devices is the diversity in mobile device hardware and software (e.g. operating system and applications—apps) and their computing capabilities (e.g. some mobile devices have limited computation and storage capabilities). In a typical network, communications between mobile and other devices are subject to a broad range of attacks, ranging from basic attacks to more sophisticated advanced persistent threat-type attacks. Therefore, it is important to authenticate the identity of the mobile device and confirm the authorization of the message. To authenticate the identity and confirm the authorization, we generally rely on proving that the user has the ownership of the private signature key corresponding to the signature. However, in schemes that rely on the use of such keys, the user's private key is typically stored as a single file on the mobile device (i.e. single point of attack). There is also the risk that the private key can be obtained during the signature generation process, or through the use of mobile forensic techniques.

Threshold cryptography can potentially be used to improve the security of the private key, by splitting and distributing a single key into a number of shares/parts that can then be stored on different devices (or for multiple users). Thus, an adversary must corrupt all the devices in order to reconstruct and obtain the private key. Such an approach can be used in applications where generating a signature requires multiple key owners or the specific message can only be viewed by corresponding key owners.

Threshold cryptography has been intensively studied since the late 1980s. One common approach is the t-out-of-n threshold secret sharing protocol proposed by Shamirand Blakley, where a single (private) key is shared between n parties. This allows the recovery of the private key with t or more shares, rather than all shares in the original threshold cryptography-based approach. In other words, to obtain the private key, an adversary has to compromise at least t parties or devices.

A known limitation in the t-out-of-n threshold secret sharing protocol is that the (entire) private key can be recovered during the signing or encryption phase. As the recovered key is usually stored on the mobile devices (e.g. Android or iOS devices), any party who holds the recovered private key can sign or encrypt message without requiring the participation of other parties.

Accordingly, a need arises for techniques that provide an efficient and secure two-party distributed signing protocol.

SUMMARY OF THE INVENTION

The techniques described herein may provide an efficient and secure two-party distributed signing protocol, for example, for the IEEE P1363 standard. In embodiments, the protocol may require two devices to separately store each part of the user's private key, and may allow these two devices to generate a valid signature without revealing the entire private key of the user. The security of the protocol may be proven, for example, in the random oracle model. Embodiments may implement the protocol using the MIRACL library and may be evaluated using, for example, Android devices. Embodiments may be advantageous for deployment in the mobile environment.

For example, in an embodiment, a method may comprise generating, at a key generation center, a first partial private cryptographic key for a user ID and a second partial private cryptographic key for the user ID, transmitting the first partial private cryptographic key to a first other device, transmitting the second partial private cryptographic key to a second other device, and generating a distributed cryptographic signature for a message using the first partial private cryptographic key and the second partial private cryptographic key.

In embodiments, the method may further comprise generating, at the key generation center, a partial private cryptographic key. Generating the distributed cryptographic signature for the message may comprise transmitting a request for a cryptographic signature from the first other device to the second other device, in response to receiving the request from the first other device, generating, at the second other device, a first plurality of intermediate values using a plurality of random numbers and the partial private cryptographic key, in response to receiving the first plurality of intermediate values from the second other device, generating, at the first other device, a second plurality of intermediate values using a plurality of random numbers and the message, in response to receiving the second plurality of intermediate values from the first other device, generating, at the second other device, a third plurality of intermediate values using the second partial private cryptographic key, and in response to receiving the third plurality of intermediate values from the second other device, generating, at the first other device, the distributed cryptographic signature using the first partial private cryptographic key.

In an embodiment, a system may comprise a processor, memory accessible by the processor, and computer program instructions stored in the memory and executable by the processor to perform generating, at a key generation center, a first partial private cryptographic key for a user ID and a second partial private cryptographic key for the user ID, transmitting the first partial private cryptographic key to a first other device, transmitting the second partial private cryptographic key to a second other device, and generating a distributed cryptographic signature for a message using the first partial private cryptographic key and the second partial private cryptographic key.

In an embodiment, a computer program product for cryptography, the computer program product comprising a non-transitory computer readable storage having program instructions embodied therewith, the program instructions executable by a computer, to cause the computer to perform a method comprising generating, at a key generation center, a first partial private cryptographic key for a user ID and a second partial private cryptographic key for the user ID, transmitting the first partial private cryptographic key to a first other device, transmitting the second partial private cryptographic key to a second other device, and generating a distributed cryptographic signature for a message using the first partial private cryptographic key and the second partial private cryptographic key.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and the invention may admit to other equally effective embodiments.

Other features of the present embodiments will be apparent from the Detailed Description that follows.

DETAILED DESCRIPTION OF THE EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Electrical, mechanical, logical, and structural changes may be made to the embodiments without departing from the spirit and scope of the present teachings. The following detailed description is therefore not to be taken in a limiting sense, and the scope of the present disclosure is defined by the appended claims and their equivalents.

The techniques described herein may provide an efficient and secure two-party distributed signing protocol, for example, for the IEEE P1363 standard. In embodiments, the protocol may require two devices to separately store each part of the user's private key, and may allow these two devices to generate a valid signature without revealing the entire private key of the user. The security of the protocol may be proven, for example, in the random oracle model. Embodiments may implement the protocol using the MIRACL library and may be evaluated using, for example, Android devices. Embodiments may be advantageous for deployment in the mobile environment.

Figure 1:
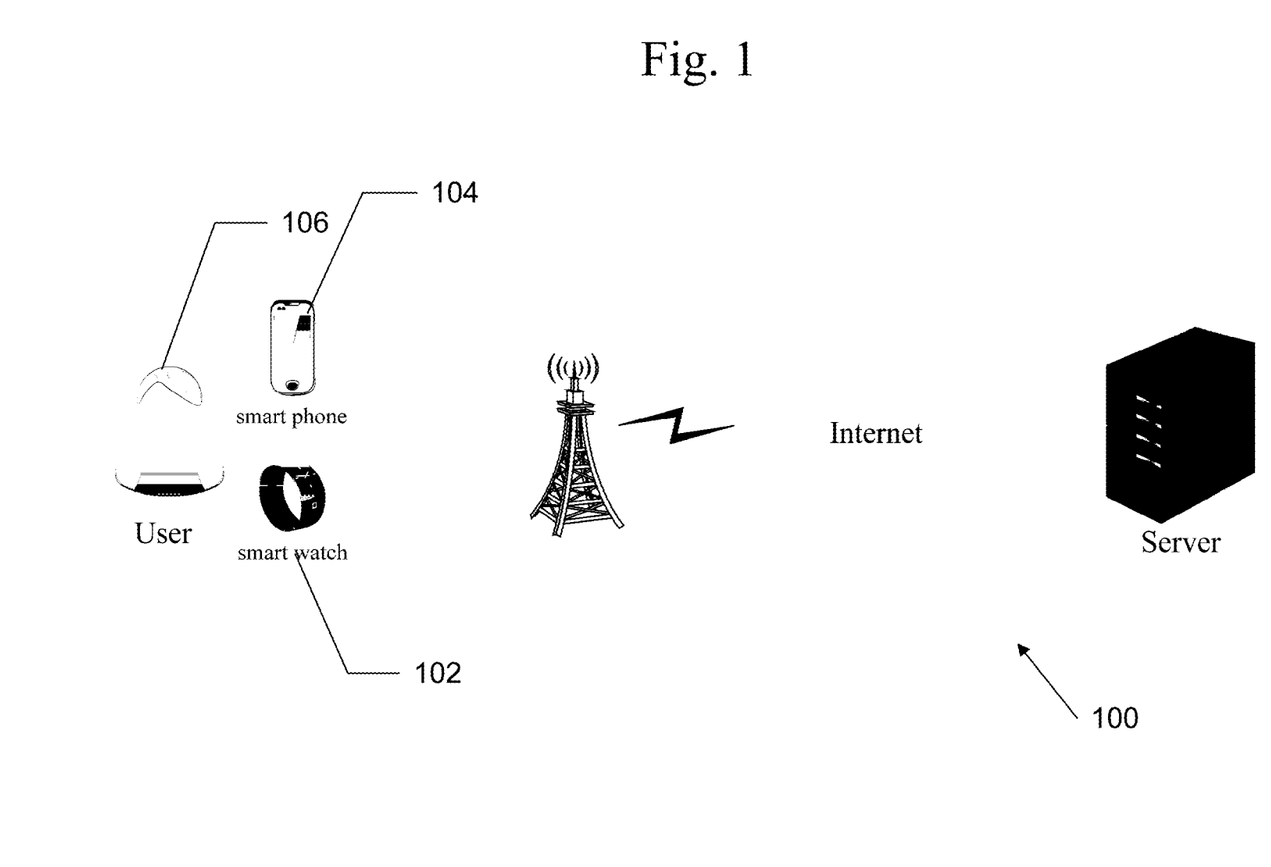
FIG. 1 illustrates an example of a typical typical mobile Internet architecture in which embodiments of the present systems and methods may be implemented.

An example of a typical mobile Internet architecture 100 is shown in FIG. 1, where mobile (Internet-connected) devices, such as smart watch 102 and smart phone 104 can collect, transmit, process and store a wide range of data (e.g. environmental data, and personally identifiable information such as health data) for a user 106. Thus, it is not surprising that mobile security is a topic of ongoing research interest.

A summary of notations used in this document is shown below:

$U_i$, $S_j$: communication partners, namely: user and server
$P_1P_2$: two devices for $U_i$
q: the order of group
s: the master key of KGC
$G_1,G_2$: additive cyclic groups of order q
$G_T$: multiplicative cyclic group of order q
$Q_1, Q_2$: the generators of additive cyclic groups $G_1,G_2$
$D_{ID}$: private key of user $U_i$
$D_{ID}^1$, $D_{ID}^2$: partial private key of two devices $P_1,P_2$
$H_1$, $H_2$: hash function of $\{0,1\}^* \to Z_q^*$
e: bilinear pairing of $G_1 \times G_2 \to G_T$
g: $e(Q_1, Q_2)$
$g^u$: exponentiation
[x,y]: number set between x and y Bilinear Pairing:

Let $G_1$ and $G_2$ denote additive cyclic groups, $G_T$, and e: $G_1 \times$ and $G_2 \to G_T$ denote a multiplication cyclic group and a bilinear map. Suppose $Q_1$ and $Q_2$ are the generators of $G_1$ and $G_2$, g is the element that $Q_1$, and $Q_2$ maps to $G_T$. Thus, the map e is a bilinear pairing on the condition that e satisfies the following properties:

1. Bilinear:

Given any two elements $a,b \in Z_q^*$, and $\forall X \in G_1, \forall Y \in G_2$, there is $e(a \cdot X, b \cdot Y) = e(X,Y)^{a \cdot b}$ 2. Non-Degenerate:

There exists at least one element X satisfies the inequation $e(X,X) \neq 1$.

3. Efficient Computability:

Given any two elements $\forall X \in G_1, \forall Y \in G_2$, there exists at least one efficient algorithm to compute $e(X,Y)$.

IEEE Standard for Identity-Based Signature:

The steps of signature generation for the IEEE standard for identity-based signature scheme (BLMQ signature scheme) are as follows:

1. Setup

Input: a security parameter k

Output: a public parameter set P (a) Establish the cyclic groups $G_1, G_2, G_T$ and a bilinear map e: $G_1 \times G_2 \to G_T$.

(b) Select two random generators $Q_1 \in G_1$ and $Q_2 \in G_2$.

(c) Generate a random server secret s in $Z_q^*$, then calculate $P_{pub} = s \cdot Q_2$ and $g = e(Q_1, Q_2)$.

(d) Make the set $P = \{P_{pub}, g, Q_1, Q_2, G_1, G_2, G_T\}$.

2. Extract

Input: a user's identity ID, a public parameter set P and the server secret s

Output: user's private key $K_{ID}$ (a) Compute the identity element $h_{ID} = H_1(ID)$ in $Z_q^*$.

(b) Compute $K_{ID} = (s + h_0)^{-1} Q_1$.

3. Signature

Input: a message m, a public parameter set P and user's private key $K_{ID}$.

Output: a signature σ.

(a) Generate a random number $r \in Z_q^*$, and compute $u = g^r$.

(b) Compute $h = H_2(m,u)$ and $S = (r+h) \cdot K_{ID}$.

(c) Output signature σ=(h,S).

4. Verify

Input: a signature σ, a message m and user's public key $h_{ID}$.

Output: valid if the signature is accepted, otherwise output invalid.

Compute $u = \dfrac{e(S, h_{ID} \cdot Q_2 + P_{pub})}{g^h}$. (a)

(b) If $h=H_2(m,u)$, then output valid, otherwise output invalid.

Mathematical Assumptions:

The mathematical assumptions required in the security proof are defined as follows:

Discrete Logarithm (DL) Problem:

Given an element $X \in G_1$ and $x \in G_T$, for any probability polynomial time (P.P.T) attacker, it is difficult to calculate $\tau \in Z_q^*$ satisfies $X = \tau \cdot Q_1$ and $x = g^\tau$.

Computational Diffie-Hellman (CDH) Problem:

Given a tuple $(g, e_1, Q_1, Q_2, aQ_1, bQ_2)$ where $(a,b) \in Z_q^*$, $Q_1, Q_2$ and $g$ are the generators of $G_1, G_2$ and $G_T$ respectively. We compute $\omega = e(Q_1, Q_2)^{ab}$ and define an algorithm A to solve CDH problem within P.P.T. There exists a negligible function $\mu(n)$ to make $\Pr[A(a \cdot Q_1, b \cdot Q_2) = \omega)] \leq \mu(n)$ when $a, b \in Z_q^*$ are unknown.

Collusion Attack Algorithm with k Traitor (k-CAA) Problem:

Given k+1 elements $$\tau Q_1, \dfrac{1}{\tau+\alpha_1}Q_1, \dfrac{1}{\tau+\alpha_2}Q_1, \ldots, \dfrac{1}{\tau+\alpha_k}Q_1$$

in which $\alpha_i$, $i \in [1 \cdot k]$. We compute $$\omega = \dfrac{1}{\tau+\alpha}Q_1$$

and define an algorithm A to solve k-CAA problem within P.P.T. For any $\alpha \notin \{\alpha_i, i \in [1 \cdot k]\}$, when $\tau$ is unknown, there exists a negligible function $\mu(n)$ to make $$\Pr\left[A\left(\tau Q_1, \dfrac{1}{\tau+\alpha_1}Q_1, \dfrac{1}{\tau+\alpha_2}Q_1, \ldots, \dfrac{1}{\tau+\alpha_k}Q_1\right) = \omega\right] \leq \mu(n).$$

Embodiments of Two-Party Signing Protocol:

Embodiments of a two-party signing protocol may include a key generation phase and a distributed signature generation phase.

Figure 2:
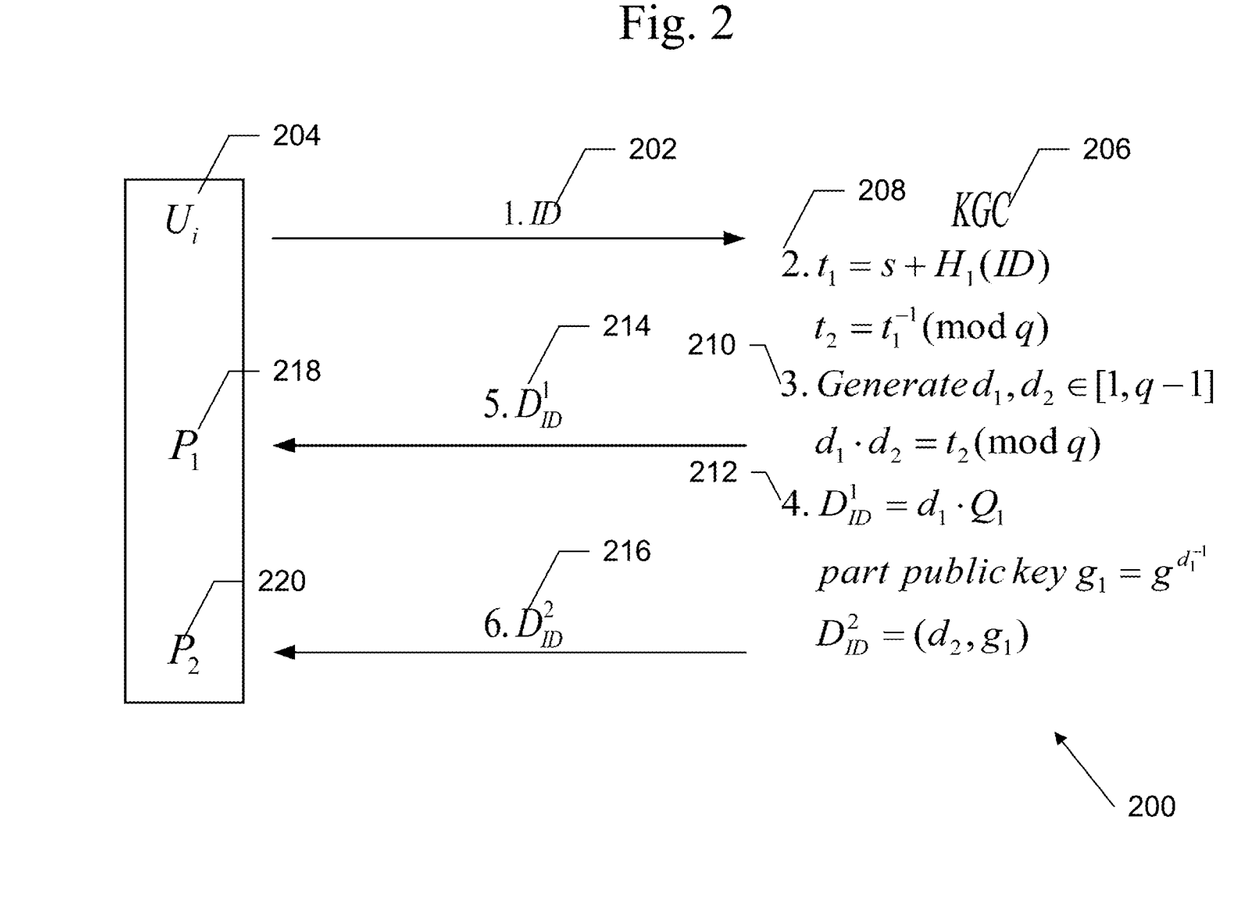
FIG. 2 illustrates an exemplary flow diagram of a key generation phase in accordance with embodiments of the present systems and methods.

Key Generation Phase:

An exemplary illustration of an embodiment 200 of a key generation phase is shown in FIG. 2. As shown in this example, an identifier (ID) 202 of a user $U_i$ 204 may be sent to key generation center (KGC) 206. KGC 206 may generate 208-212 the user's private keys $D_{ID}^1$ 214 and $D_{ID}^2$ 216, such that $D_{ID}^1$ and $D_{ID}^2$ can be combined to form a valid private key. Then, KGC 206 may distribute $D_{ID}^1$ 214 and $D_{ID}^2$ 216 to be stored on two devices $P_1$ 218 and $P_2$ 220 respectively.

For example, $U_i$ 204 may send a request including user ID ID 202 to KGC 206. Upon receiving the request, KGC 206 may compute 208 $t_1 = s + H_1(ID)$ and $t_2 = t_1^{-1} \pmod q$. KGC 206 may generate 210 a random number $d_1 \in [1, q-1]$, and may compute $d_2 = t_2 \cdot d_1^{-1} \pmod q$. KGC 206 may compute the first partial private key $D_{ID}^1 = d_1 \cdot Q_1$ 214 and send $D_{ID}^1$ 214 to $P_1$ 218. Then, KGC 206 may compute a partial private key $g_1 = g^{d_1^{-1}}$ and the second partial private key $D_{ID}^2 = (d_2, g_1)$ 216. Finally, KGC 206 may send $D_{ID}^2$ 216 to $P_2$ 220.

Figure 3:
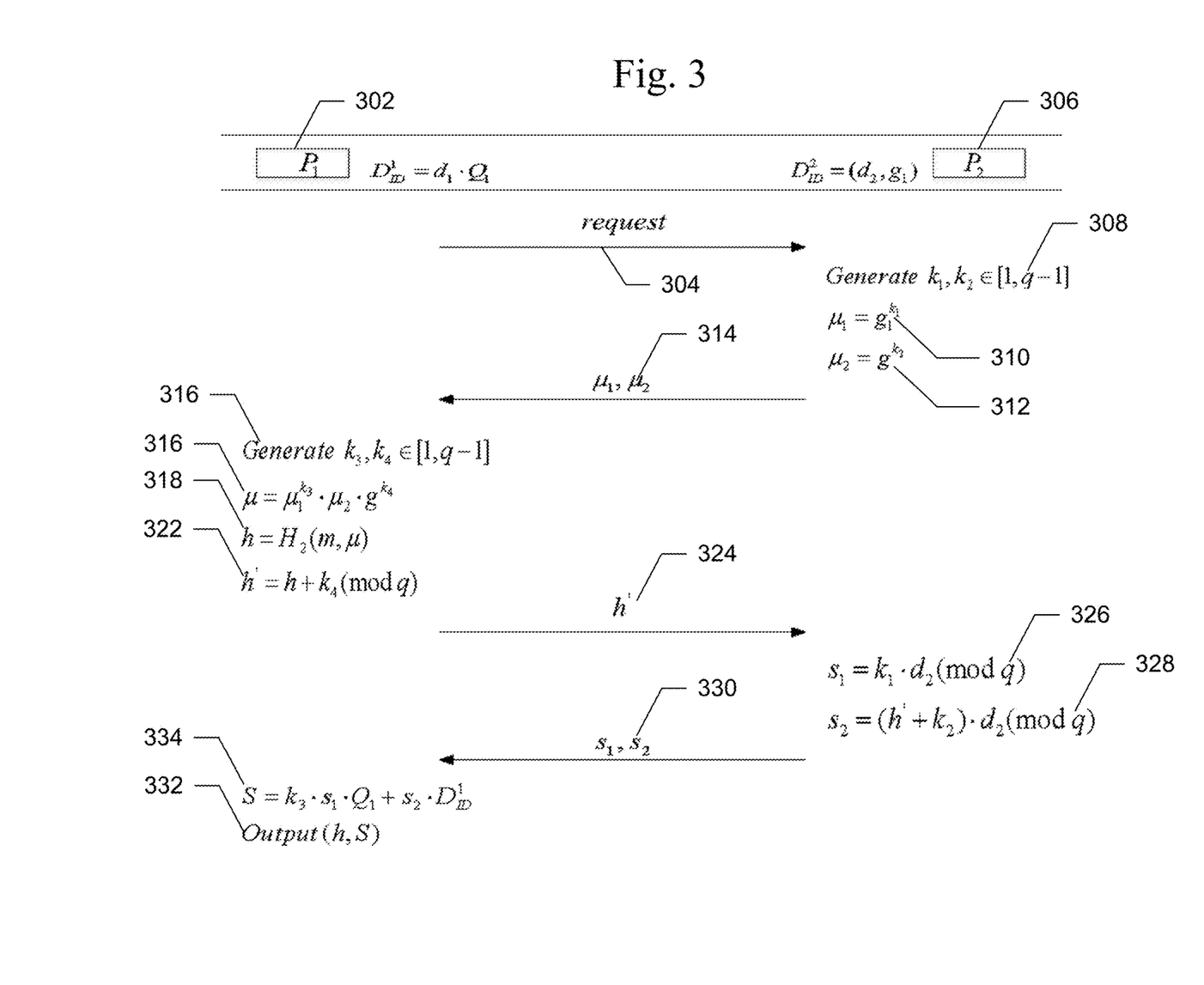
FIG. 3 illustrates an exemplary flow diagram of a distributed signature generation phase in accordance with embodiments of the present systems and methods.

Distributed Signature Generation Phase:

An exemplary illustration of an embodiment 300 of a distributed signature generation phase is shown in FIG. 3. As shown in this example, a user may inputs a message m to be signed and may receive a legitimate signature $\sigma = (h, S)$ as the output.

1. $P_1 \to P_2$: {request}
    $P_1$ 302 sends a signature request 304 to $P_2$ 306.
2. $P_2 \to P_1$: $\{\mu_1, \mu_2\}$
    (a) Upon receiving the request 304 from $P_1$ 302, $P_2$ 306 chooses two random numbers $k_1, k_2 \in [1, q-1]$ 308.
    (b) $P_2$ 306 computes $\mu_1 = g_1^{k_1}$ 310 and $\mu_2 = g^{k_2}$ 312.
    (c) $P_2$ 306 sends $\{\mu_1, \mu_2\}$ 314 to $P_1$ 302.
3. $P_1 \to P_2$: $\{h'\}$.
    (a) Upon receiving the message 314, $P_1$ 302 chooses two random numbers $k_3, k_4 \in [1, q-1]$ 316.
    (b) $P_1$ 302 computes $\mu = \mu_1^{k_3} \cdot \mu_2 \cdot g^{k_4}$ 318, $h = H_2(m, \mu)$ (the hash value of the message m) 320 and $h' = h + k_4 \pmod q$ 322.
    (c) $P_1$ 302 sends $\{h'\}$ 324 to $P_2$ 306.
4. $P_2 \to P_1$: $\{s_1, s_2\}$
    (a) Upon receiving the message 324, $P_2$ 306 computes $s_1 = k_1 \cdot d_2 \pmod q$ 326 and $s_2 = (h' + k_2) \cdot d_2 \pmod q$ 328.
    (b) $P_2$ 306 sends $\{s_1, s_2\}$ 330 to $P_1$ 302.
5. $P_1$ 302 outputs the signature 332.
    (a) $P_1$ 302 receives the message 330, and computes $S = k_3 \cdot s_1 \cdot Q_1 + s_2 \cdot D_{ID}^1$ 334.
    (b) P1 verifies the signature $(h, S)$ 332, and if the signature 332 is valid then the signature will be given as the output.

The validity of the signature may be verified by computing $$\mu^* = \dfrac{e(S, H_1(ID)Q_2 + P_{pub})}{g^h} \text{ and } h^* = H_2(m, \mu^*),$$

comparing whether $h^*$ is equal to $h$.

Security Analysis—System Model:

Definition 2.

Let A be a P.P.T adversary, and nt be a digital signature protocol $\pi = \{\text{Gen}, \text{Sign}, \text{Verify}\}$. $\text{Sign}_{A,\pi}(1^n)$ may be defined as follows.

1. $(pk, sk) \leftarrow \text{Gen}(1^n)$. A runs the $\text{Gen}(1^n)$ algorithm, and outputs a random key pair $(pk, sk)$.
2. $(m^*, \sigma^*) \leftarrow A^{Sign sk(\cdot)}$. A runs the $\text{Sign}(\bullet)$ algorithm, and outputs $(m^*, \sigma^*)$.
3. The set of all m that A queries to its oracle is M. When $m^* \notin M$ and $\text{Verify}_{pk}(m^*, \sigma^*) = 1$, the experiment outputs 1.

Definition 3: Existentially Unforgeable Under Choose Message Attacks.

For any P.P.T adversary A, if there exists a negligible function $\mu$ for every n that satisfies $\Pr[\text{Sig}_{A,\pi}(1^n) = 1] \leq \mu(n)$, then the signature protocol $\pi$ is existentially unforgeable under the chosen message attack.

Definition 4.

Let A be a P.P.T adversary, and $\pi$ be a digital signature protocol $\pi = \{\text{Gen}, \text{Sign}, \text{Verify}\}$. $\text{DistSign}_{A,\Pi}^b(1^n), b \in \{1, 2\}$ may be defined as follows.

1. $(pk, sk) \leftarrow A^{\Pi_{3-b}(1^n)}$.
2. $(m^*, \sigma^*) \leftarrow A^{\Pi_b(\cdot, \cdot)}$.
3. The set of all inputs $m \in (sid, m)$ that A queries to its oracle is M, and the identifier sid should not be previously queried. When $m^* \notin M$, $\text{Verify}_{pk}(m^*, \sigma^*) = 1$ and Verify are as specified in $\pi$, the experiment outputs 1.

Definition 5: Secure Two-Party Distributed Signature Scheme.

For any P.P.T adversary A and every b∈{1,2}, if there exists a negligible function for every n that satisfies $Pr[DistSign_{A,\Pi}^b(1^n)=1] \leq \mu(n)$, then Π is a secure two-party protocol for distributes signature generation for π.

Definition 6: Blindness.

Given two signature records and a signature pair, for any P.P.T adversary A, A is not able to specify which signature record belongs to the signature pair, then Π is not blind.

In the above definitions, the distributed key generation phase should be run first and only once, before running the distributed signature phase. An honest device $P_{3-b}$ operates the protocol Π and makes the stateful oracle $\Pi_b(\cdot,\cdot)$. In the two-party signature generation phase $DistSign_{A,\Pi}^b$, A can control the device $P_b, b \in \{1,2\}$, choose the messages to be signed, and interact with multiple instances to generate a forged signature concurrently.

A can win the game if the message m* for the forged signature is not queried. The oracle has two inputs: a session identifier and an input, and it works as follows:

1. On receiving a query (sid,m), if the distributed key generation phase has not completed, then oracle returns ⊥.

2. In the event that a query (sid,m) is received when the distributed key generation phase has commenced, if sid is the first to be queried, then the device $P_{3-b}$ operates the protocol with session identifier sid and the input message m which is to be signed. What the device $P_{3-b}$ first sends in the sign phase is the oracle replay.

3. On receiving a query (sid,m) when the distributed key generation phase has computed and identifier sid has been queried, the oracle sends the message m to the device $P_{3-b}$ and returns the next message output from $P_{3-b}$.

Proof of Security:

The protocol Π may be proved to be a secure two-party distributed signature protocol and existentially unforgeable under chosen message attacks, and the protocol is also blind in this section.

Theorem 1:

Suppose that IEEE standard for identity-based (BLMQ) signature scheme is existentially unforgeable under choose message attacks, then the protocol is a secure two-party distributed signature and existentially unforgeable under choose message attacks.

Proof.

If an adversary A can break the protocol with the probability c, then it can break the protocol with probability ε+μ(n), where μ is a negligible function. In this proof, the security of a corrupted $P_1$ and a corrupted $P_2$ are proven seperately. For any A who can attack the protocol and forge a signature in $DistSign_{A,\Pi}^b(1^n)$, we select another adversary S who can forge a BLMQ signature in $Sign_{S,\Pi}(1^n)$ with a negligibly close probability. Then, for every P.P.T adversary A and b∈{1,2}, there exists a negligible function μ for every n and an adversary S, that satisfies, $$|Pr[Sign_{S,\pi}(1^n)=1]-Pr[DistSign_{A,\Pi}^b(1^n)=1]| \leq \mu(n)$$

According to Definition 3, there exists a negligible function μ' for every n that satisfies $Pr[Sign_{A,\pi}(1^n)=1] \leq \mu'(n)$. Combining this with the above equation, $Pr[DistSign_{S,\Pi}^b(1^n)=1] \leq \mu(n)+\mu'(n)$ is obtained. Thus, we prove the equation from two aspects: b=1 and b=2.

Proof of b=1.

The adversary corrupts device $P_1$. Assume A can forge a signature in $DistSign_{A,\Pi}^b(1^n)$ and S can forge a BLMQ signature in $Sign_{S,\pi}(1^n)$. Thus, A can use the response of S.

1. S receives $(1^n, H_1(ID))$, in which $H_1(ID)$ is user's public key.

2. S invokes A and simulates the instructions of A in DistSign with the input of $(1^n)$ and the output as described in the following:

(a) If the distributed key generation phase has not completed, then S replies ⊥ to all queries (sid,m).

(b) On receiving a query (sid,m), if sid is the first to be queried, S queries the signature in DistSign and receives (h,S), and S can compute t in then BLMQ signature scheme, then A queries S with identifier sid as below.

Case 1:

i. The first message $m_1$ in $(sid, m_1)$ as $(prove, 1, (\mu_1, \mu_2), (k_1, k_2))$ that S sends to $F_{zk}$, if $\mu_1 = g_1^{k_1} = g^{k_1 d_1^{-1}}$ and $\mu_2 = g^{k_2}$, then A computes $\{\mu, h'\}$, and replies the message $(prove, 2, \mu, k_3)$ to S.

ii. On receiving the message, if the proof is valid, then S sets $s_1 = k_3^{-1} \cdot S$ and replies the message $(prove, 3, s_1, k_3^{-1})$ to A.

Case 2:

i. A does not execute the instructions of $P_1$ and set $\mu = g^x$ and $h = H_2(m, \mu)$. Then, A sends the message $(prove, 1, \mu, x)$ to S.

ii. On receiving the message, if the proof is valid, then S generates random $(s_1, s_2)$ and sends them to A.

3. A computes σ* and outputs a signature (m*,σ*), then S terminals the simulation and outputs (m*,σ*).

The view of A in the simulation of key generation phase is different from the real execution of protocol Π. The way an honest $P_1$ generates μ in the real Π is that: $P_1$ uses the message from $P_2$ to generate μ, whereas A computes $\mu \leftarrow g^x$, in which x is a random number. Consider that S behaves as $P_2$ completely in all messages. Since $\{x, k_1, k_2, k_3, k_4\}$ are all chosen randomly, it is determined that there is no distinction between $\mu = g^x$ and $\mu = \mu_1^{k_3} \mu_2 g^{k_4}$.

In Case 1 of the distributed signing phase, the simulator $P_2$ generates $s_1$ and $s_2$ using the random numbers $\{k_1, k_2\}$ and its own private key $d_2$. The output of A is computationally indistinguishable to the real output signature in a real protocol. In other words, A outputs a valid signature pair (m*,σ*) with the same probability in the simulation and in real DistSign. The signatures can be distinguished by verifying whether they match with the public key. When A receives messages from $P_2$, it computes the signature S*. The following equation results:

$$S^* = k_3 \cdot k_1^{-1} \cdot S = (k_3 k_1 * d_1^{-1} + k_2 + k_4 + h) \cdot K_{ID} = (k_3 k_1 * d_1^{-1} + k_2 + k_4 + h) \cdot d_1 d_2 \cdot Q_1$$

If A knows the valid signature, then A can compute $d_2$ with a non-negligible probability ε. That means A can solve the DL problem with a non-negligible probability ε. According to the DL problem, $Pr[d_2|(k_3 k_1 * d_1^{-1} + k_2 + k_4 + h) \cdot d_1 d_2 \cdot Q_1] \leq \mu(n)$, which contradicts $$\varepsilon \leq Pr[d_2|(k_3 k_1 * d_1^{-1} + k_2 + k_4 + h) \cdot d_1 d_2 \cdot Q_1] \leq \mu(n).$$

Thus, A cannot obtain the private key of $P_2$ even when $P_1$ corrupted and knows the correct signature.

In Case 2 of the distributed signing phase, since the simulator's private key $d_2$ and the KGC's secret key s are unknown to A, A selects a random number $d_2^*$ to construct signature $S^* = (x+h) \cdot d_1 \cdot d_2^* \cdot Q_1$. There exists:

$$\mu^* = \frac{e(S^*, H_1(ID)Q_2 + P_{pub})}{g^h} =$$

$$\frac{e(S^*, H_1(ID)Q_2 + sQ_2)}{g^h} = \frac{e(S^*, (H_1(ID)+S)Q_2)}{g^h} =$$

-continued $$\frac{e((x+h)d_1d_2^*Q_1, (H_1(ID)+s)Q_2)}{g^h} = \frac{g^{(x+h)d_1d_2^*\cdot(H_1(ID)+s)}}{g^h} =$$

$$g^{xd_1d_2^*\cdot(H_1(ID)+s)} = \frac{\mu^*}{\mu} = \frac{g^{xd_1d_2^*\cdot(H_1(ID)+s)}}{g^x} = g^{d_1d_2^*\cdot(H_1(ID)+s)}$$

A obtains $g^{d_1d_2^*\cdot(H_1(ID)+s)}$ and outputs $d_2^*$ as the answer to the CDH problem. Suppose that A can select the right $d_2^*$ to make the above equations hold in a non-negligible probability $\varepsilon$. That means A can solve the CDH problem in a non-negligible probability $\varepsilon$. According to the CDH problem, $\Pr[d_2^*|g^{d_1d_2^*\cdot(H_1(ID)+s)}] \le \mu(n)$, this contradicts $$\varepsilon \le \Pr[d_2^*|g^{d_1d_2^*\cdot(H_1(ID)+s)}] \le \mu(n).$$

Thus, the signature cannot be verified based on the unknown $d_2$ and s.

Proof of b=2.

The adversary corrupts device $P_2$, and we follow the same steps as the case of b=1. Unlike with b=1, in this case, the signature is computed by S and replied to A. In other words, A can forge a signature in $DistSign_{A,\Pi}^b(1^n)$ and S can forge a BLMQ signature in $Sign_{S,\pi}(1^n)$. Thus, the adversary A cannot forge a legitimate signature under the circumstances that S private key is not known to A.

This simulation is similar to the above with a difference that the last message $P_2$ to $P_1$ composes of random numbers. $P_1$ cannot determine whether the random numbers used in messages from $P_2$ is consistent. In this simulation, S computes the signature pair and replies them to A. If A can forge a legitimate signature $\sigma^*$, then A can carry out the attack without knowing the private key of $P_1$. This problem may be solved by getting S to abort the simulation at some random points. S chooses a random number $i \in \{1, \ldots, p(n)+1\}$, in which $p(n)$ means the number of queries. If S chooses correctly, then the simulation is successful.

1. S receives $(i'', H_1(ID))$, in which $H_1(ID)$ is user's public key.
2. Let $p(\cdot)$ denotes the number of queries that A executes protocol $\Pi$. Thus, S can choose a random number $i \in \{1, \ldots, p(\cdot)+1\}$.
3. S invokes A and simulates the instructions of A in DistSign with the input of $(1^n)$. The output is described in the following:
   (a) If the distributed key generation phase has not completed, then S replies $\bot$ to all queries (sid,m).
   (b) On receiving a query (sid,m), if sid is the first queried, then S computes and sends the corresponding reply (proof, sid) to A.
   (c) After S queries the signature in DistSign and returns (h,S), S can compute the $\mu$ in BLMQ signature scheme. Then, A queries S with identifier sid as below:
      i. A sends the first message $m_1=(prove,1,(\mu_1,\mu_2),(k_1,k_2))$ in $(sid,m_1)$. If $\mu_1=g_1^{k_1}=g^{k_1d_1}$ and $\mu_2=g^{k_2}$, then S sets $\mu=g^{k_1d_1^{-1}k_3+k_2}$ and $h=H_2(m,\mu)$, and replies the message (proof,2,h) to A. Otherwise, S terminates the simulation.
      ii. The second message $m_2$ in $(sid,m_2)$ is denoted as $(prove,3,(s_1,s_2),d_2)$. If this is the i-th query of A to $\Pi$, then S terminates the simulation and returns $\bot$. Otherwise, it continues.
4. Whenever A stops the query and outputs the $(m^*,\sigma^*)$, S terminates the simulation and outputs $(m^*,\sigma^*)$.

A can obtain $p(n)$ correct signatures since $i \in \{1, \ldots, p(n)+1\}$. Thus, the following equation:

$$\mu^* = \frac{e(S^*, H_1(ID)Q_2 + P_{pub})}{g^h} = \frac{e(S^*, (H_1(ID)+s)Q_2)}{g^h} =$$

$$\frac{e((k_1k_3d_1^{-1}+k_2+h)d_1d_2Q_1, (H_1(ID)+s)Q_2)}{g^h} =$$

$$\frac{g^{(k_1k_3d_1^{-1}+k_2+h)}}{g^h} = g^{k_1k_3d_1^{-1}+k_2}$$

In this simulation, A keeps its own random number invariant during all queries, and S generates different randomly in every query. Thus, for $p(n)$ correct signatures, A computes $g^{k_2}$ at the beginning of protocol $\Pi$, and there exists:

$$\mu_1^* = g^{k_1k_3^1d_1^{-1}+k_2}$$
$$\mu_2^* = g^{k_1k_3^2d_1^{-1}+k_2}$$
$$\ldots$$
$$\mu_n^* = g^{k_1k_3^nd_1^{-1}+k_2}$$

A obtains $g^{k_1k_3^id_1^{-1}+k_2}$, $i \in \{1, \ldots, p(n)+1\}$ and outputs $k_3d_1^{-1}$ as the answer to k-CAA problem. Suppose that A can compute $k_3d_1^{-1}$ to make the above equations hold in a non-negligible probability $\varepsilon$. That means A can solve the k-CAA problem in a non-negligible probability $\varepsilon$. According to the Collusion Attack Algorithm with k Traitor, $\Pr[k_1k_3d_1^{-1}|g^{k_1k_3^id_1^{-1}+k_2}] \le \mu(n)$. This contradicts $$\varepsilon \le \Pr[k_1k_3d_1^{-1}|g^{k_1k_3^id_1^{-1}+k_2}] \le \mu(n).$$

Thus, A cannot know any information about $P_1$ in the event that $P_2$ is corrupted.

Theorem 2

Suppose a P.P.T adversary A is able to specify which signature record belongs to the signature pair in a negligible function $\mu$ for every n, then we can say our protocol is blind.

Proof

Suppose A can distinguish the signature records with the probability $\varepsilon$. In this proof, we separately prove the blindness of device $P_2$ and an external adversary.

For Device $P_2$.

For every signature pair $(m,\sigma)$ generated by device $P_1$, the signature record for $P_2$ includes $\{\mu_1,\mu_2,h',s_1,s_2,k_1,k_2,d_2\}$. Given two signature records $\{\mu_1',\mu_2',h'',s_1',s_2',k_1',k_2',d_2\}$ and $\{\mu_1'',\mu_2'',h''',s_1'',s_2'',k_1'',k_2'',d_2\}$, and a signature pair (m,h,S). From the signature pair (m,h,S), $P_2$ can compute:

$$\mu = \frac{e(S, H_1(ID)Q_2 + P_{pub})}{g^h}$$

$$= g^{k_1k_3^1d_1^{-1}+k_2+k_4}$$

$P_2$ can compute $k_4$ on the basis of $h'=h+k_4$. If $P_2$ can specify which of $\{k_1',k_2'\}$ and $\{k_1'',k_2''\}$ belongs to $\mu$, that means, $P_2$ can solve DL problem in a non-negligible probability $\varepsilon$. According to Discrete Logarithm Problem, $\Pr[k_3, d_1|g^{k_1k_3^1d_1^{-1}+k_2}] \le \mu(n)$, it's contradictory $$\varepsilon \le \Pr[k_3, d_1|g^{k_1k_3^1d_1^{-1}+k_2}] \le \mu(n)$$

$P_2$ cannot specify which record belongs to the signature pair.

For External Adversary.

For every signature pair $(m,\sigma)$ generated by device $P_1$, the signature record for an external adversary includes $\{\mu_1,\mu_2,$ h',$s_1$,$s_2$}. Given two signature records {$\mu_1$',$\mu_2$',h'',$s_1$',$s_2$'} and {$\mu_1$'',$\mu_2$'',h''',$s_1$'',$s_2$''}, and a signature pair (m,h,S). From the signature pair (m,h,S), the adversary can compute:

$$\mu = \frac{e(S, H_1(ID)Q_2 + P_{pub})}{g^h}$$

$$= g^{k_1 k_3^1 d_1^{-1} + k_2 + k_4}$$

The adversary can compute $k_4$ on the basis of h'=h+$k_4$. For {$\mu_1$',$\mu_2$'}, the adversary cannot compute $k_1$' and $k_2$' without solving the DL problem in a non-negligible probability $\varepsilon$. Thus, the adversary cannot specify which record belongs to the signature pair.

Figure 4:
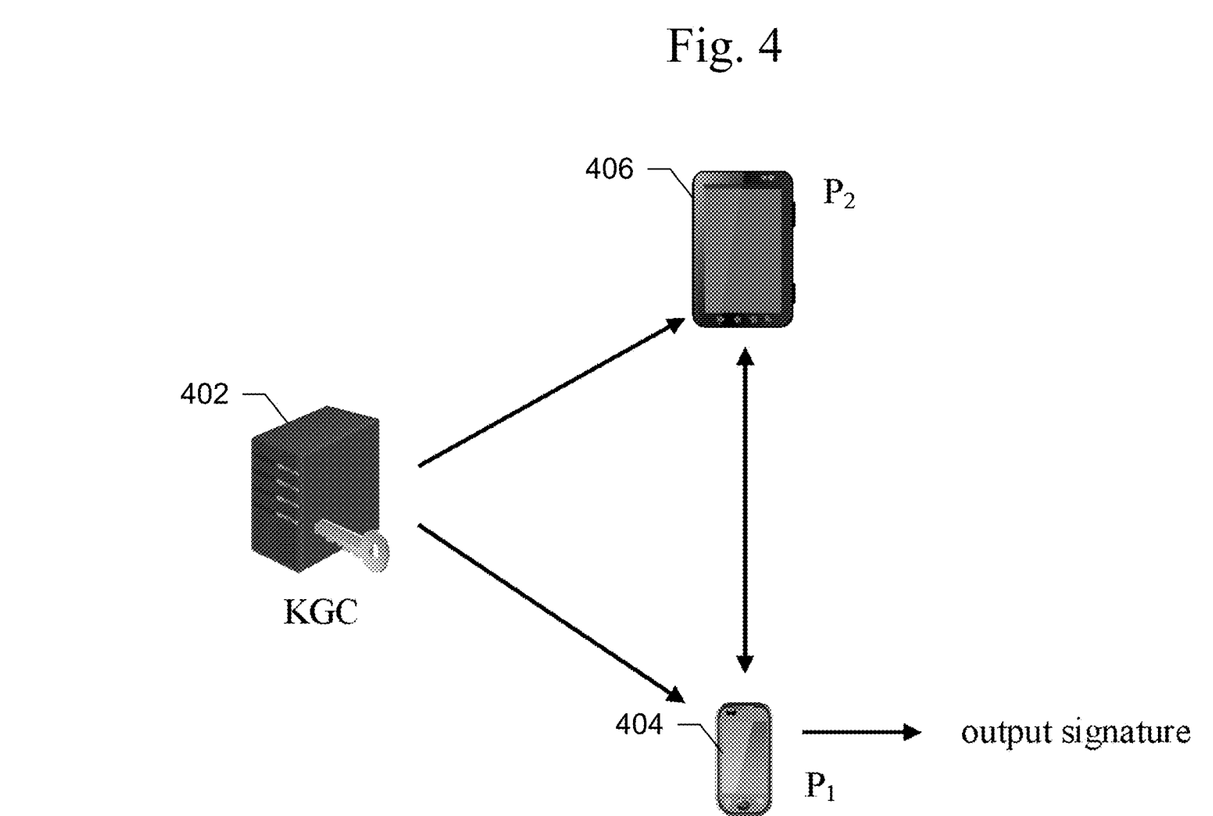
FIG. 4 illustrates an exemplary block diagram of a system in which embodiments of the present systems and methods may be implemented.

Performance Analysis:

Embodiments of the described protocol may be implemented, for example, using the MIRACL library on two Android devices (i.e. Samsung Galaxy S5 with a Quad-core 2.45G processor, 2G bytes memory and the Google Android 4.4.2 operating system; and Google Nexus 6 with a Quad-core, 2.7 GHz processor, 3G bytes memory and the Google Android 7.1.2 operating system) and a personal computer (Dell with an i7-6700 3.40 GHz processor, 8G bytes memory and the window 10 operating system). Such embodiments may be useful for evaluating performance of the protocol. In such an evaluation, the personal computer is the KGC which generates partial private keys for both devices, which interact with each other via bluetooth, as shown in FIG. 4. The security levels of the different curves are shown in Table 1:

TABLE 1

| Security level | |
| --- | --- |
| Type | Symmetric cipher key length (AES) |
| MNT k = 6 | 80 |
| BN k = 126 | 128 |
| KSS k = 18 | 192 |
| BLS k = 24 | 256 |

It is known that:

1. The security of MNT k=6 curve corresponds to 80 bits cipher length of AES.
2. The security of BN k=12 curve corresponds to 128 bits cipher length of AES.
3. The security of KSS k=18 curve corresponds to 192 bits cipher length of AES.
4. The security of BLS k=24 curve corresponds to 256 bits cipher length of AES.

Figure 5:
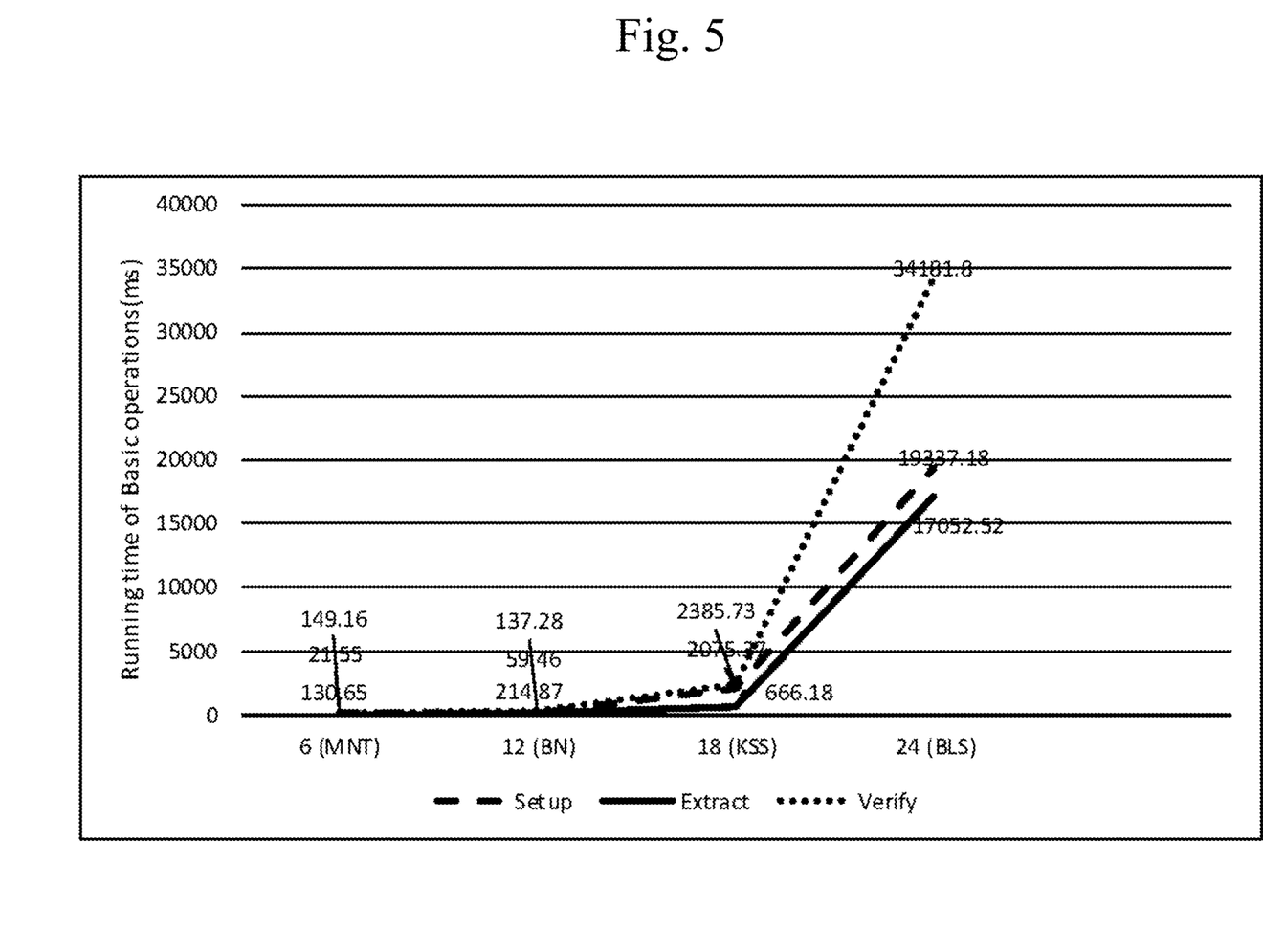
FIG. 5 illustrates an example of results of an experiment to determine performance of embodiments of the present systems and methods may be implemented.

In embodiments, the implementation may include parts such as setup, extract, signature and verify. The protocol Π may generate a public parameter set P and the user's private key in the setup phase and the extract phase, respectively. Π may verify the validity of the signature after the signature phase. The runtime of each part is shown in Table 2 and FIG. 5.

TABLE 2

| Distributed key generation and verification | | | |
| --- | --- | --- | --- |
| TypeProcess | Setup | Distributed | Verify |
| MNT k = 6 | 149.16 | 21.55 | 130.65 |
| BN k = 12 | 137.28 | 59.46 | 214.87 |

TABLE 2-continued

| Distributed key generation and verification | | | |
| --- | --- | --- | --- |
| TypeProcess | Setup | Distributed | Verify |
| KSS k = 18 | 2075.37 | 666.18 | 2385.73 |
| BLS k = 24 | 19337.18 | 17052.52 | 34181.8 |

Figure 6:
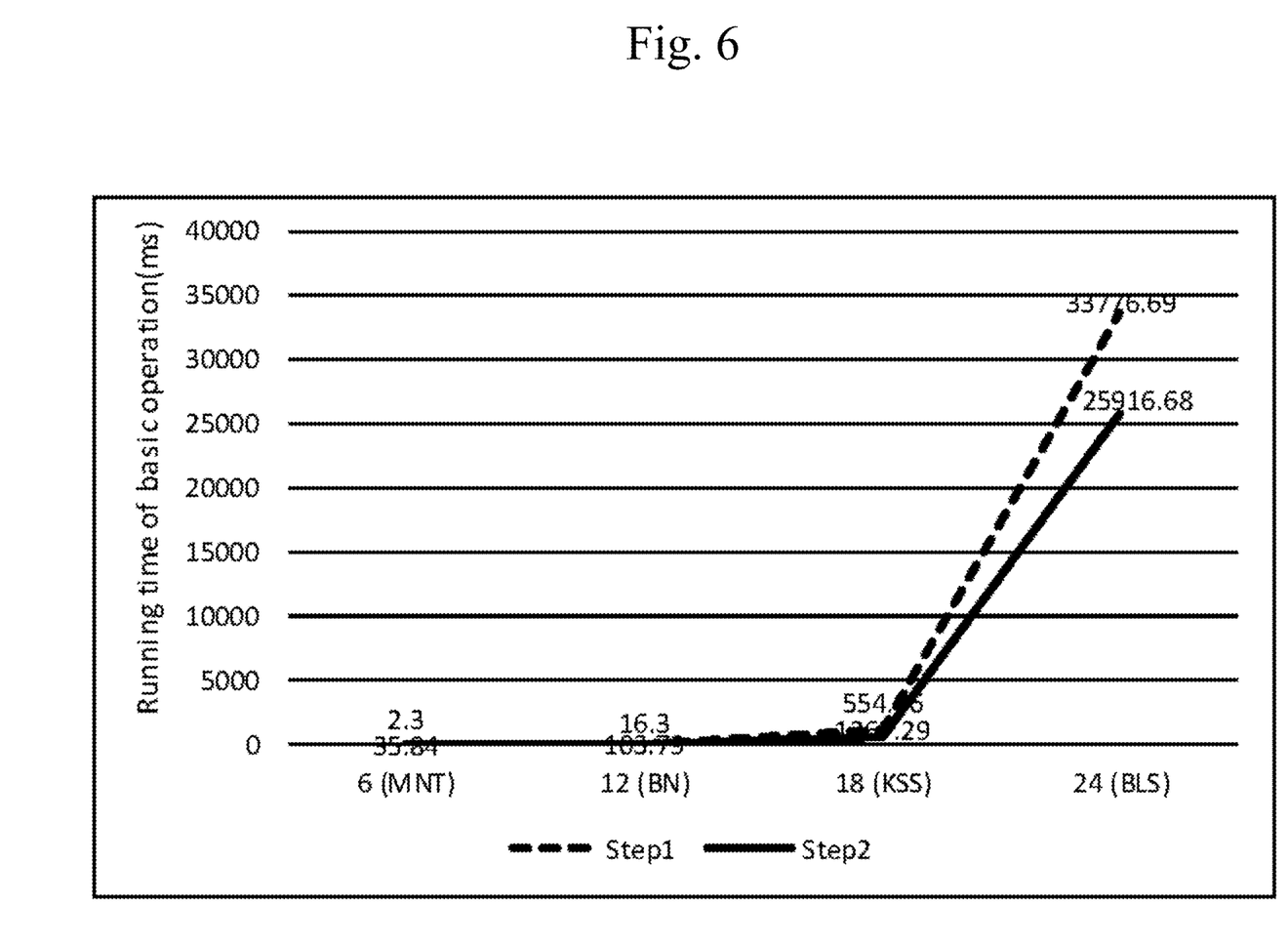
FIG. 6 illustrates an example of results of an experiment to determine performance of signature phase in accordance with embodiments of the present systems and methods may be implemented.

The computation cost of the signature phase may be analyzed. The runtime of the signature phase is shown in Table 3 and FIG. 6. In the signature phase, step1 refers to the execution of instructions by $P_2$ after receiving a request from $P_1$, step2 refers to the execution of instructions by $P_1$ before sending messages to $P_2$, step3 refers to the execution of instructions by $P_2$, and step4 refers to the execution of instructions by $P_1$ after receiving messages from $P_2$

TABLE 3

| Running times of signature phase | | | | |
| --- | --- | --- | --- | --- |
| TypeProcess | Step1 | Step2 | Step3 | Step4 |
| MNT k = 6 | 35.84 | 2.3 | 0.82 | 6.18 |
| BN k = 12 | 103.79 | 16.3 | 1.11 | 9.38 |
| KSS k = 18 | 1267.29 | 554.96 | 5.19 | 29.65 |
| BLS k = 24 | 33776.69 | 25916.68 | 36.46 | 93.43 |

Embodiments of the present systems and method may provide a secure and efficient two-party distributed signature protocol, which builds on the identity-based signature scheme in the IEEE P1363 standard. For example, a valid signature can be generated without requiring the entire private key to be reconstructed, and the key cannot be generated from one (lost or stolen) device. This can be extremely attractive to mobile device users, as more users own more than one mobile device. In other words, a misplaced or stolen device will not result in the complete compromise of the user's data.

Figure 7:
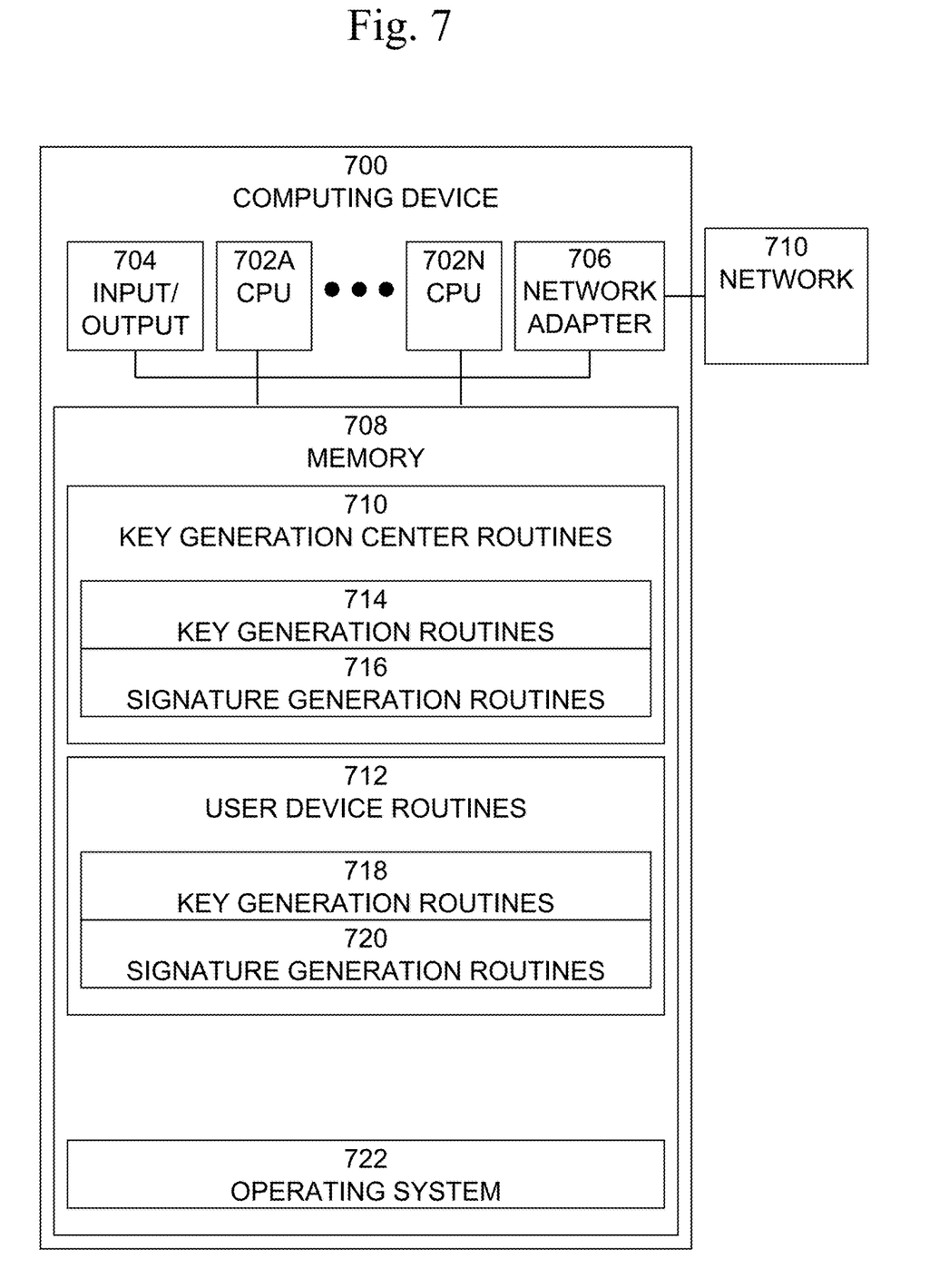
FIG. 7 illustrates an example of a computing device in which embodiments of the present systems and methods may be implemented.

An exemplary block diagram of a computing device 700, in which entities and processes involved in the embodiments described herein may be implemented, is shown in FIG. 7. Computing device 700 may typically be implemented using one or more programmed general-purpose computer systems, such as embedded processors, systems on a chip, personal computers, workstations, server systems, and minicomputers or mainframe computers, or in distributed, networked computing environments. Computing device 700 may include one or more processors (CPUs) 702A-702N, input/output circuitry 704, network adapter 706, and memory 708. CPUs 702A-702N execute program instructions in order to carry out the functions of the present communications systems and methods. Typically, CPUs 702A-702N are one or more microprocessors, such as an INTEL CORE® processor.

FIG. 7 illustrates an embodiment in which computing device 700 is implemented as a single multi-processor computer system, in which multiple processors 702A-702N share system resources, such as memory 708, input/output circuitry 704, and network adapter 706. However, the present communications systems and methods also include embodiments in which computing device 700 is implemented as a plurality of networked computer systems, which may be single-processor computer systems, multi-processor computer systems, or a mix thereof.

Input/output circuitry 704 provides the capability to input data to, or output data from, computing device 700. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 706 interfaces device 700 with a network 710. Network 710 may be any public or proprietary LAN or WAN, including, but not limited to the Internet.

Memory 708 stores program instructions that are executed by, and data that are used and processed by, CPU 702 to perform the functions of computing device 700. Memory 708 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 708 may vary depending upon the function that computing device 700 is programmed to perform. In the example shown in FIG. 7, exemplary memory contents are shown representing routines and data for embodiments of the processes described above. However, one of skill in the art would recognize that these routines, along with the memory contents related to those routines, may not be included on one system or device, but rather distributed among a plurality of systems or devices, based on well-known engineering considerations. The present systems and methods may include any and all such arrangements.

In the example shown in FIG. 7, memory 708 is shown as including both key generation center routines 710 and user device routines 712. However, in many embodiments, only one such set of routines may be present in the device. For example, a key generation center (KGC) may be implemented using one or more server computer systems and may include only key generation center routines 710, while a user device may be may be implemented using a mobile device, such as a smartphone, and may include only user device routines 712.

In the example shown in FIG. 7, key generation center routines 710 may include key generation routines 714 and signature generation routines 716, while user device routines 712 may include key generation routines 718 and signature generation routines 720. Key generation routines 714 may include software routines to perform the KGC portion of of embodiments of key generation processes, as described above. Signature generation routines 716 may include software routines to perform the KGC portion of embodiments of signature generation processes, as described above. Key generation routines 718 may include software routines to perform the user device portion of embodiments of key generation processes, as described above. Signature generation routines 720 may include software routines to perform the user device portion of embodiments of signature generation processes, as described above. Operating system 722 may provide overall system functionalities.

As shown in FIG. 7, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it.

Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. Thus, it is impossible for any program to damage the execution of any of the other programs running on the system. However, the programs have no way to exchange any information except through the operating system (or by reading files stored on the file system).

Multi-process computing is similar to multi-tasking computing, as the terms task and process are often used interchangeably, although some operating systems make a distinction between the two. The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the blocks may occur out of the order noted in the Figures. For example, two blocks shown in succession may, in fact, be executed substantially concurrently, or in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or that carry out combinations of special purpose hardware and computer instructions. Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

From the above description, it can be seen that the present invention provides a system, computer program product, and method for the efficient execution of the described techniques. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

While the foregoing written description of the invention enables one of ordinary skill to make and use what is considered presently to be the best mode thereof, those of ordinary skill will understand and appreciate the existence of alternatives, adaptations, variations, combinations, and equivalents of the specific embodiment, method, and examples herein. Those skilled in the art will appreciate that the within disclosures are exemplary only and that various modifications may be made within the scope of the present invention. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. The invention should therefore not be limited by the described embodiment, method, and examples, but by all embodiments and methods within the scope and spirit of the invention. Accordingly, the present invention is not limited to the specific embodiments as illustrated herein, but is only limited by the following claims.

What is claimed is:

1. A method comprising:
generating, at a key generation center, a first partial private cryptographic key for a user ID and a second partial private cryptographic key for the user ID;
transmitting the first partial private cryptographic key to a first other device;
transmitting the second partial private cryptographic key to a second other device; and
generating a distributed cryptographic signature for a message using the first partial private cryptographic key and the second partial private cryptographic key;
wherein, when the first partial private cryptographic key and the second partial private cryptographic key are combined, a valid private cryptographic key is formed; and
wherein generating the distributed cryptographic signature for the message comprises:
transmitting a request for a cryptographic signature from the first other device to the second other device;
generating at the second other device, in response to receiving the request from the first other device, a first plurality of intermediate values using a plurality of random numbers and the first partial private cryptographic key;
generating at the first other device, in response to receiving the first plurality of intermediate values from the second other device, a second plurality of intermediate values using a plurality of random numbers and the message;
generating, at the second other device, in response to receiving the second plurality of intermediate values from the first other device, a third plurality of intermediate values using the second partial private cryptographic key; and
generating, at the first other device, in response to receiving the third plurality of intermediate values from the second other device, the distributed cryptographic signature using the first partial private cryptographic key.

2. The method of claim 1, further comprising:
generating, at the key generation center, a partial private cryptographic key.

3. A system comprising a processor, memory accessible by the processor, and computer program instructions stored in the memory and executable by the processor to perform:
generating, at a key generation center, a first partial private cryptographic key for a user ID and a second partial private cryptographic key for the user ID;
transmitting the first partial private cryptographic key to a first other device;
transmitting the second partial private cryptographic key to a second other device; and
generating a distributed cryptographic signature for a message using the first partial private cryptographic key and the second partial private cryptographic key
wherein, when the first partial private cryptographic key and the second partial private cryptographic key are combined, a valid private cryptographic key is formed; and
wherein generating the distributed cryptographic signature for the message comprises:
transmitting a request for a cryptographic signature from the first other device to the second other device;
generating at the second other device, in response to receiving the request from the first other device, a first plurality of intermediate values using a plurality of random numbers and the first partial private cryptographic key;
generating at the first other device, in response to receiving the first plurality of intermediate values from the second other device, a second plurality of intermediate values using a plurality of random numbers and the message;
generating, at the second other device, in response to receiving the second plurality of intermediate values from the first other device, a third plurality of intermediate values using the second partial private cryptographic key; and
generating, at the first other device, in response to receiving the third plurality of intermediate values from the second other device, the distributed cryptographic signature using the first partial private cryptographic key.

4. The system of claim 3, further comprising:
generating, at the key generation center, a partial private cryptographic key.

5. A computer program product for cryptography, the computer program product comprising a non-transitory computer readable storage having program instructions embodied therewith, the program instructions executable by a computer, to cause the computer to perform a method comprising:
generating, at a key generation center, a first partial private cryptographic key for a user ID and a second partial private cryptographic key for the user ID;
transmitting the first partial private cryptographic key to a first other device;
transmitting the second partial private cryptographic key to a second other device; and
generating a distributed cryptographic signature for a message using the first partial private cryptographic key and the second partial private cryptographic key
wherein, when the first partial private cryptographic key and the second partial private cryptographic key are combined, a valid private cryptographic key is formed; and
wherein generating the distributed cryptographic signature for the message comprises:
transmitting a request for a cryptographic signature from the first other device to the second other device;
generating at the second other device, in response to receiving the request from the first other device, a first plurality of intermediate values using a plurality of random numbers and the first partial private cryptographic key;
generating at the first other device, in response to receiving the first plurality of intermediate values from the second other device, a second plurality of intermediate values using a plurality of random numbers and the message;
generating, at the second other device, in response to receiving the second plurality of intermediate values from the first other device, a third plurality of intermediate values using the second partial private cryptographic key; and
generating, at the first other device, in response to receiving the third plurality of intermediate values from the second other device, the distributed cryptographic signature using the first partial private cryptographic key.

6. The computer program product of claim 5, further comprising:
   generating, at the key generation center, a partial private cryptographic key.

* * * * *